United States Patent [19]

Cook

[11] Patent Number: 4,561,239
[45] Date of Patent: Dec. 31, 1985

[54] PIVOTAL HANDLE MOUNT

[75] Inventor: Glyn F. Cook, Barrie, Canada

[73] Assignee: Black & Decker Inc., Newark, Del.

[21] Appl. No.: 637,593

[22] Filed: Aug. 3, 1984

[30] Foreign Application Priority Data

Dec. 15, 1983 [CA] Canada .................................. 443335

[51] Int. Cl.⁴ ............................................. A01D 53/00
[52] U.S. Cl. ..................... 56/320.1; 56/DIG. 18;
280/47.37 R; 16/111 A
[58] Field of Search ...................... 56/320.1, DIG. 18;
280/47.37 R, 47.38, 47.36; 16/111 A, 111 R,
112

[56] References Cited

U.S. PATENT DOCUMENTS

| | | | |
|---|---|---|---|
| 854,424 | 5/1907 | Ketterer | 56/DIG. 18 |
| 2,617,670 | 11/1952 | Welsh | 280/47.37 R |
| 2,716,556 | 8/1955 | Boyce | 280/47.36 |
| 2,763,492 | 9/1956 | Phelps | 280/47.36 |
| 3,702,016 | 11/1972 | Keesee | 280/47.37 R |
| 3,764,156 | 10/1973 | Nepper et al. | 56/DIG. 18 |
| 3,797,213 | 3/1974 | Sadow, Jr. et al. | 56/320.1 |

FOREIGN PATENT DOCUMENTS 1013578  7/1977  Canada .......................... 56/DIG. 18

Primary Examiner—Gene Mancene
Assistant Examiner—David I. Tarnoff
Attorney, Agent, or Firm—Raymond A. Eckersley

[57] ABSTRACT

A motor operated gardening appliance having a multi-position, swing-over handle is provided with a handle attachment wherein the pivotal center of the handle may be readily adjusted, so as to achieve a locked-up rigidly secured handle in the selected operating position.

4 Claims, 9 Drawing Figures

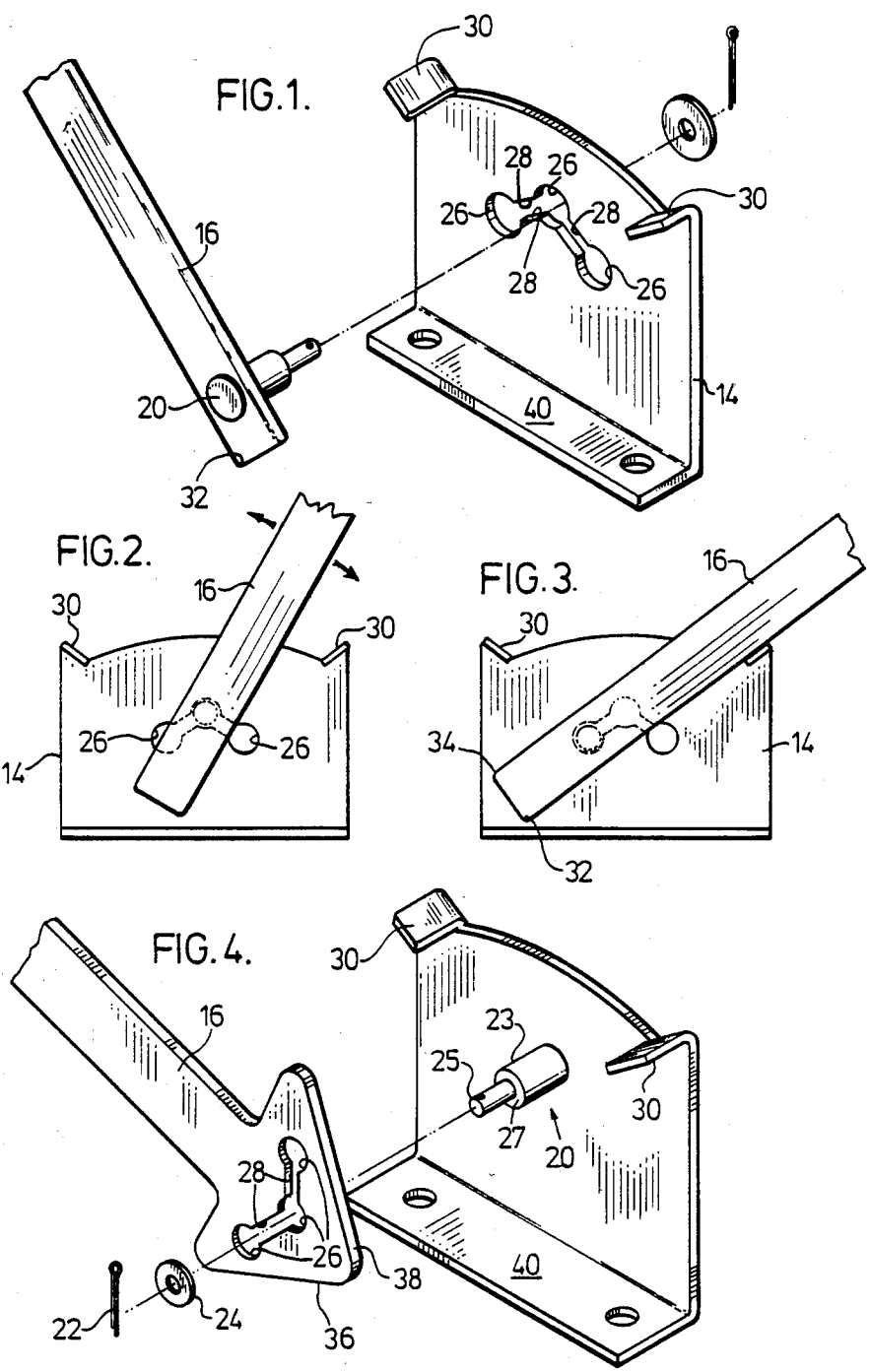

PIVOTAL HANDLE MOUNT

BACKGROUND OF THE INVENTION

This invention is directed to a handle attachment system for a swing-over handle, with particular reference to a motor operated gardening appliance such as a lawn mower.

Swing-over handles are well known particularly in the lawn mower art, such as Canadian Pat. No. 1,013,578, issued July 12, 1977 to Nepper et al., the need having arisen to provide a handle system having locking provision when the handle is in a working position, to provide rigid attachment of the handle to the mower when in use.

SUMMARY OF THE INVENTION

The presently disclosed arrangement provides a swing-over handle attachment system for a gardening appliance, including a pair of mounting bracket members attached to the appliance, bifurcated handle means having a pair of attachment foot members in mutually spaced apart relation for individual attachment to a respective bracket, each having a pivot pin in substantially axially aligned relation with the other pivot pin, each pin connecting a foot member in removable pivotal relation with the respective bracket member, one of the pairs of members having a plurality of interconnected pin seats extending transversely thereof to receive a journal portion of a pivot pin in secured pivotal relation therein, slots extending between the pin seats in interconnecting relation therewith having a width less than the diameter of the pin journal portion, to preclude direct passage of the journal portion of a pin from one pin seat to an adjacent pin seat, each pivot pin having a reduced shank portion for entry within a slot to permit relocation of the pin journal portion in a selected one of the pin seats, while retaining connection of the handle means with the bracket members.

The subject arrangement may be embodied by attachment of the pivot pins to the foot members of the implement handle, the interconnected pin seats being located in the handle securing brackets mounted to the top deck, in the case of a lawn mower.

Alternatively, the pivot pins may be attached to the securing brackets, with the interconnected pin seats located in the handle foot members.

The presently disclosed arrangement provides a low cost, readily manufactured and assembled handle assembly wherein a positive lock between handle and mower housing is provided for each of the two working positions. The provision of a third, intermediately located pin seat enables the handle to be located for free pivoting movement.

The positive interconnection betweeen handle and housing when positioned in either of the two working positions assures compliance with government safety regulations requiring rigid attachment of handle to housing in the working state. The handle utilizes the inherent flexibility of the bifurcated construction to spring load the foot members against the bracket members.

Accidental removal of the handle from the attachment brackets is precluded by the provisions of removable cotter pins inserted transversely through the free ends of the handle pivot pins.

Both embodiments utilize lugs extending from the brackets to contact the handle, and edge portions of the handle foot members bearing against the deck surface, as the means for locking the handle against pivotal movement.

Selection of pivot pin dimensions wherein the axial length of the pin journal portion exceeds the width of the bracket lugs results in the spacing apart of the foot members of the handle, when the pin reduced shank portions extend through the slots in the brackets, to the extent that the handle foot members do not make contact with the bracket lugs, and the handle can be pivoted freely to any desired position, including a folding position, flat to the deck of the mower. Movement of the pivot pins along the slots until the pin journal portions enter a respective pin seat in each of the brackets releases the handle foot portions so that the lie behind the bracket lugs in secured relation thereby.

BRIEF DESCRIPTION OF THE DRAWINGS

Certain embodiments of the invention are described, reference being made to the accompanying drawings, wherein:

FIG. 1 is an exploded general view of a first embodiment of a handle foot member and associated bracket, with washer and cotter pin;

FIG. 2 is a side view of the elements of FIG. 1, in assembled relation, with the pivot pin located in the intermediate position;

FIG. 3 is a side view of the assembled elements of FIG. 1, with the pivot pin located in an operative position and the handle locked in position;

FIG. 4 corresponds to FIG. 1, showing a second embodiment;

DESCRIPTION OF THE PREFERRED EMBODIMENT

Figure 5:
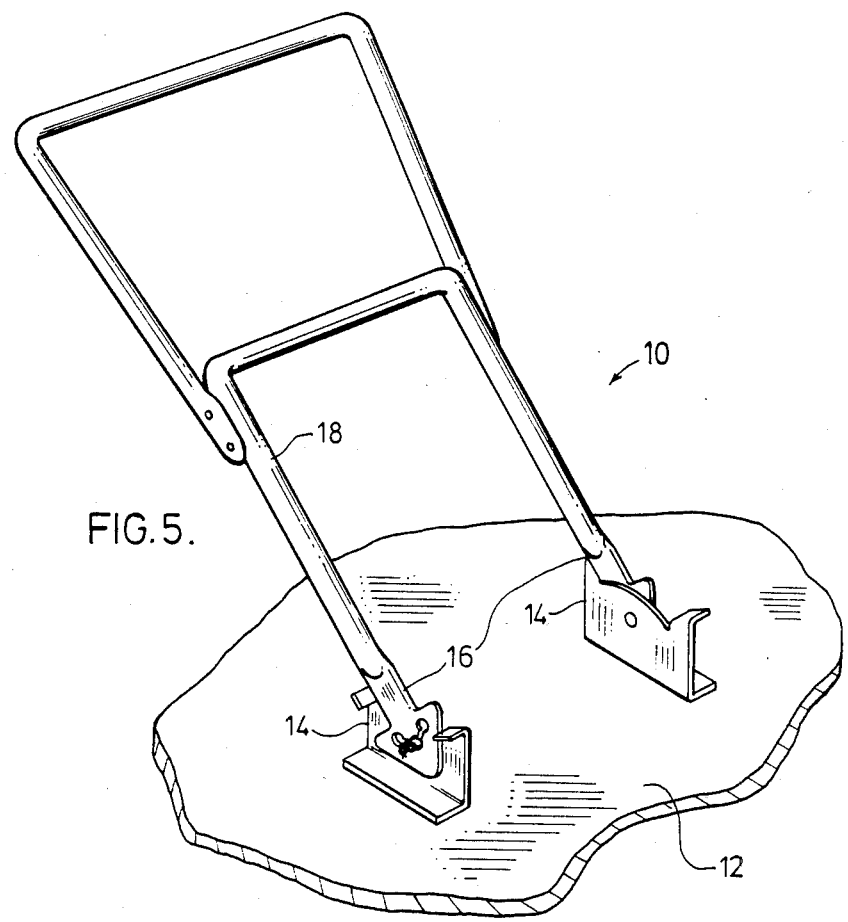
FIG. 5 is a general view of a handle and bracket members in one of the locked positions, having the brackets located between the foot members.
Figure 6:
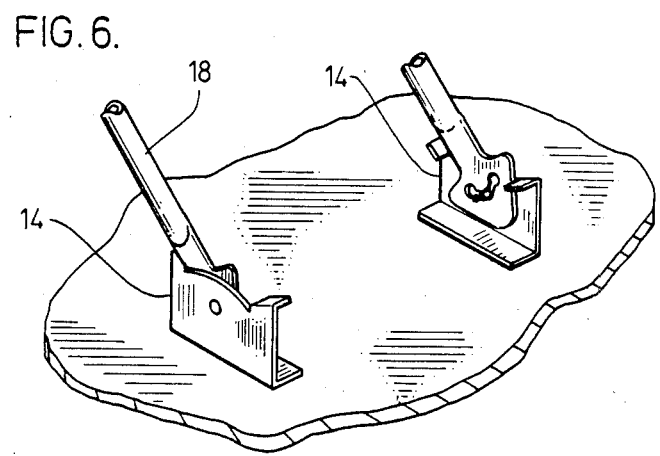
FIG. 6 is a general view of an embodiment having the bracket members located outside the foot members.
Figure 8:
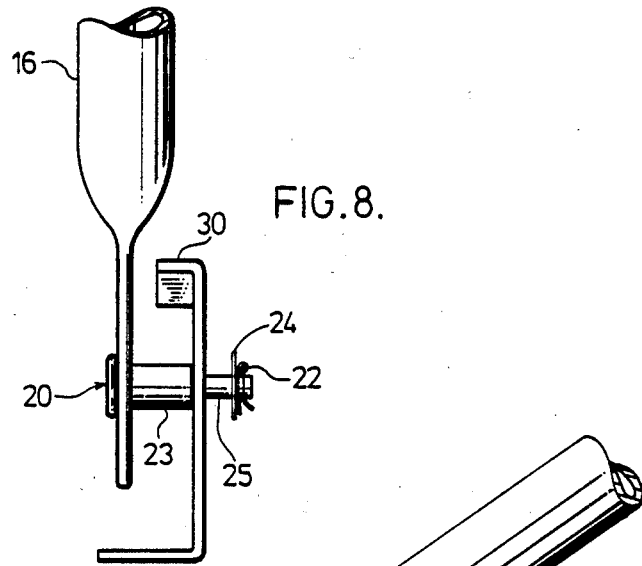
FIG. 8 is an end view of the arrangement shown in FIG. 7.
Figure 7:
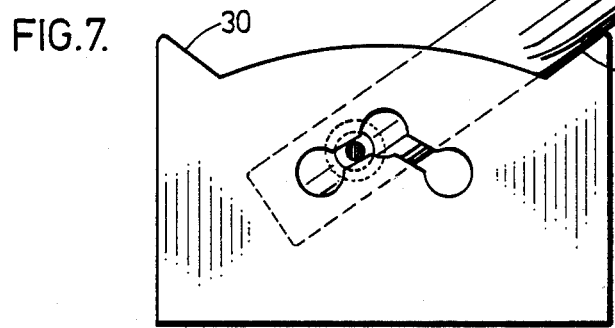
FIG. 7 is a side view of a bracket member and handle portion having the pivot pin located in a slot portion of the bracket intermediate the pin seats.
Figure 9:
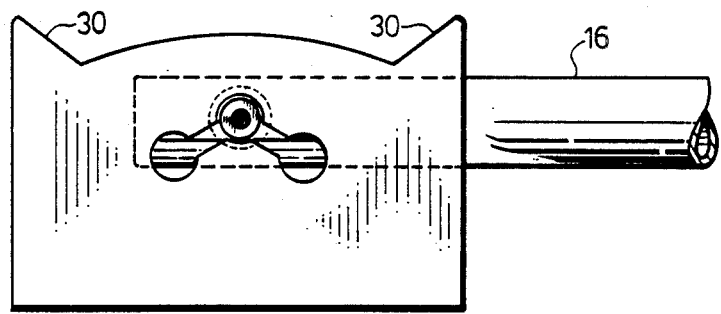
FIG. 9 is a side view corresponding to FIG. 7, having the handle locked in a folding position.

The drawings illustrate the present invention in relation to a mower installation 10 (FIG. 5) having a flat upper deck 12 to which bracket members 14 are secured, by bolts or other well known means such as welding or rivetting. Foot members 16 of a bifurcated handle 18 are attached to the brackets 14 by way of pivot pins 20, being secured in assembled relation by a cotter pin 22 and a washer 14, in each instance.

In the embodiment shown in FIGS. 1, 2 and 3, the pivot pins 20 are each rigidly secured to a foot member 16, and the respective bracket member 14 is provided with a plurality of pin seat apertures 26 interconnected by slots bounded by walls 28.

Each pivot pin 20 has a journal portion 23, a reduced diameter shank portion 25 and a shoulder 27 therebetween. The diameter of journal portion 23 permits axial entry thereof into the seat apertures 26, and precludes entry of journal portions 23 between slot walls 28. The diameter of shank portion 25 permits entry thereof between slot walls 28, for passage thereby to one of the other seat apertures 26, whereat the journal portion 23 can enter axially within the respective aperture 26.

The relative positioning of the pivot pins 20, and the dimensions of the foot members 16 are such that, when the pivot pins are located in one or other of the outer apertures 26, the handle 18 will be secured substantially immovable relative to the deck 12, being in supported contact against one or other of the lugs 30, whilst at the same time a corner portion 32 or 34; 36 or 38 bears against the face 40 of bracket member 14, or against the top surface of the deck top 12, where appropriate.

In operation, by springing the foot members to relatively displace the pivot pins 20 axially, bringing the shank portions 25 into alignment with the slot walls 28, upon entry of the shank portions 25 along the slots, the shoulder portions 27 of the pins may be permitted to bear against the face adjacent the slot. When the pin 20 comes into registry with the adjacent aperture 26, the journal portions 23 will enter that aperture 26 axially, and the handle 18 will be effectively relocated. In the event the pivot pins 20 are pivoted in the intermediate aperture 26, the foot portions 32, 34; 36 or 38 will not wedge against the bracket surface 40 or the deck top surface, as the case may be, thus leaving the handle 18 free to pivot about the pins 20 within the limits imposed by the lugs 30.

With the pivot pins 20 displaced to an intermediate position, having the pin shoulder portions 27 bearing against the bracket surfaces bounding slot walls 28, the pins 20 are axially restrained, and hold the foot portions 16 of the handle 18 in a position so as to be clear of the bracket lugs 20, whereby the handle 18 can be freely pivoted to any desired position, including a folding position parallel with the mower deck. Displacement of the pins 20 to an aperture 26, to permit entry of shank portions 25 within the aperture 26 serves to locate the foot portions 16 of the handle 18 in locked relation beneath the lugs 30. This then permits storage of the mower, including hanging by its handle.

What I claim as new and desire to secure by Letters Patent of the United States of America is:

1. A swing-over handle attachment system for a gardening appliance, comprising a pair of mounting bracket members attached to the appliance, bifurcated handle means having a pair of attachment foot portions in mutually spaced apart relation for individual attachment to a respective bracket, each foot portion having a single pivot pin secured thereto and extending in substantially axially aligned relation with the other pivot pin, each said pivot pin connecting a said foot portion in moveable and pivotal relation with a respective said bracket member, each said bracket member having a plurality of interconnected pin seats to receive a journal portion of a said pivot pin in secured pivotal relation therein, having slots extending upwardly between and interconnecting said pin seats, the width of said slots being less than the diameter of said pin journal portions, to preclude passage of a said pin journal portion therethrough, each said pin having a reduced shank portion for entry within said slots, to permit relocation of said pin journal portion in a selected said pin seat while retaining connection of said handle means with said bracket members, two outer pin seats providing two working positions for said handle, wherein foot portions of said handle spaced from said pins are, in use, located in secured non-pivotal abutting relation with adjoining fixed abutment portions of said appliance and a pin seat intermediate said two outer pin seats providing a third working position for said handle, for free pivotal movement of the handle about said intermediate seat between said two working positions.

2. The appliance as claimed in claim 1, being a lawnmower, wherein said bracket members are located between said handle foot members.

3. The appliance as claimed in claim 1, being a lawnmower, wherein said handle foot members are located between said bracket members.

4. The appliance as claimed in claim 1, each said pin journal being of sufficient axial extent that, when displaced into axial abutting relation with a surface of said bracket bounding said slot a respective said handle foot portion is displaced for free pivotal movement past a projecting portion of said bracket member.

* * * * *